(12) United States Patent
Alvarado et al.

(10) Patent No.: US 6,748,073 B2
(45) Date of Patent: Jun. 8, 2004

(54) UNINTERRUPTED AUTOMATIC CALL DISTRIBUTION DURING FAILURE AND RECOVERY OF COMPUTER-TELEPHONY INTEGRATION

(75) Inventors: Joaquin Omar Alvarado, Eatontown, NJ (US); Didina Burok, Matawan, NJ (US); Andrew D. Flockhart, Thornton, CO (US); Eugene P. Mathews, Barrington, IL (US); Peter J. Matteo, Eatontown, NJ (US); Christopher Moss, Flower Mound, TX (US); Robert Daniel Nalbone, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 334 days.

(21) Appl. No.: 10/037,274

(22) Filed: Jan. 3, 2002

(65) Prior Publication Data

US 2003/0123641 A1 Jul. 3, 2003

(51) Int. Cl.⁷ .......................... H04M 3/00; H04M 5/00; H04M 7/00
(52) U.S. Cl. .............................. 379/266.01; 379/221.04; 379/265.02
(58) Field of Search ................. 379/266.01, 266.04, 379/266.06, 265.02, 219, 220.01, 221.03, 221.04, 279

(56) References Cited

U.S. PATENT DOCUMENTS

| | | | |
|---|---|---|---|
| 5,878,130 A | 3/1999 | Andrews et al. | |
| 6,111,947 A | * 8/2000 | Galgano et al. | 379/269 |
| 6,137,862 A | 10/2000 | Atkinson et al. | |
| 6,181,776 B1 | 1/2001 | Crossley et al. | |
| 6,665,395 B1 | * 12/2003 | Busey et al. | 379/265.09 |

* cited by examiner

Primary Examiner—Benny Tieu
(74) Attorney, Agent, or Firm—David Volejnicek

(57) ABSTRACT

In a computer integrated telephony call center where an adjunct host (160) normally controls enqueuing of calls (168) in call queues (120) of an ACD system (101) and corresponding call queues (120') of the adjunct host and assigning of the enqueued calls to agents, the ACD system assumes (604) control over its call queues upon loss of the control by the adjunct host (e.g., upon failure (600) of the adjunct host). The ACD system flags (602, 606) all calls that are enqueued at the time of loss of the adjunct host control as well as all calls that the ACD subsequently enqueues as being under ACD system control. When the adjunct host regains its control ability, the ACD system stops flagging new calls, call queues of the host processor are cleared (702), and the adjunct host regains control (722) of enqueuing calls in call queues of the ACD and the adjunct host. But the adjunct host regains control (630, 730) of assigning calls from each call queue of the ACD system and the corresponding call queue of the adjunct host only when all flagged calls have been removed (628) from that ACD call queue by the ACD system. The adjunct host resumes assigning work to each agent only when the adjunct host has regained control (732, 734) of assigning calls from all call queues that are served by that agent. Failure and restoration of control by the adjunct host is thereby made transparent to calls.

22 Claims, 7 Drawing Sheets

UNINTERRUPTED AUTOMATIC CALL DISTRIBUTION DURING FAILURE AND RECOVERY OF COMPUTER-TELEPHONY INTEGRATION

CROSS REFERENCE TO A RELATED APPLICATION

This application shares a common disclosure with an application of J. O. Alvarado et al. entitled "Computer-Telephony Integration That Uses Features Of An Automatic Call Distribution System", U.S. application Ser. No. 10/037,779, filed on even date herewith and assigned to the same assignee.

TECHNICAL FIELD

This invention relates to automatic call distribution systems and to computer-telephony integration therewith.

BACKGROUND OF THE INVENTION

Automatic call distribution (ACD) systems distribute calls for servicing in a call center among a group of agents, based on various criteria such as availability and skills of the agents and needs of the callers. An ACD system detects and answers incoming calls. It looks in its memory for instructions on what to do with the calls. Based on these instructions it enqueues each call in a call queue that corresponds to the call's type and gives the calls some "in-queue" treatment, such as messages indicating that someone will answer the call shortly and how long the caller is likely to wait for an answer, and/or connects the calls to a voice-response unit to collect more information about the calls. When a call reaches the head of its call queue and an agent who services this type of calls becomes available, the ACD system connects the call to that agent for servicing. Many sophisticated ACD systems provide a variety of additional features as well.

Computer-telephony integration (CTI) applies additional computer intelligence to the making, receiving, and managing of calls. CTI involves connecting a host (adjunct) computer to a telephone switch, such as an ACD or a private branch exchange, and having the computer issue commands to the switch to distribute the calls to the agents. At the same time, the computer usually retrieves stored data relating to the calls (or, more precisely, to the callers) and displays the retrieved data on display screens of the agents to whom the calls are sent for servicing. In a multi-media call center that also services contacts (communications) other than calls, such as e-mail, Internet messages, faxes, etc., the host computer manages these contacts akin to how the ACD system manages calls, and integrates management and servicing of calls with the management and servicing of the other contacts.

CTI systems usually do not have the same high-reliability characteristics as have been built over the decades into ACD systems. Customers desire to obtain the enhanced services of a CTI system, but are often unwilling to do so unless there is a robust mechanism for handling calls when the CTI service is lost. When the CTI service is lost (failover), there must be an alternative mechanism in place to process calls and to assign calls to agents for servicing calls. Also, when the CTI service is restored (recovery), there must be a mechanism for transitioning back to CTI control of calls. Both of these transitions must be handled automatically by the system without disrupting the processing and servicing of calls and without losing calls.

In the prior art, failover and recovery mechanisms of CTI systems are usually inadequate. Failover is sometimes handled reasonably well, but it is typical that recovery of CTI services cannot be achieved while the system is active. Usually, it is necessary to wait until a quiet period when there are no calls in the system before CTI services can be restored. This may mean waiting until the end of the business day before full CTI service can be restored.

SUMMARY OF THE INVENTION

This invention is directed to solving these and other problems and disadvantages of the prior art. Illustratively according to the invention, calls are enqueued as ACD calls to ACD call queues and assigned to ACD agents for servicing under control of a host processor (e.g., a CTI host) during normal CTI operation. The host processor may simultaneously be controlling other, non-call, contacts as well. The ACD infrastructure is thus preserved, and it provides the basis for uninterrupted automatic call distribution during failure and recovery of CTI. When loss of host processor control occurs, the ACD system flags all existing and new calls as being under ACD system control, and the ACD system assumes control of existing and new calls, including of their enqueuing and/or assignment to agents. In effect, the agents are now under control of the ACD system, and the host processor has ceased assigning work to those agents. When host processor control ability is restored, the ACD system stops flagging new calls and the host processor resumes control of enqueuing of the new calls, but the ACD system retains control of assignment of existing (presently-enqueued) calls to agents, and host processor control of call assignment is restored one call queue at a time, and only when all of the existing (flagged) calls are removed from that call queue by the ACD system. Only when control of all call queues that are served by an individual agent has been returned to the host processor does the host processor resume control over that agent, including assigning of calls (and other work) to that agent.

Generally according to one aspect of the invention, a method of operating a contact center comprising an ACD system and a host processor that is separate from the ACD system but that controls enqueuing of calls in call queues of the ACD system and controls assigning of the calls (and perhaps even of other work) to agents for servicing, comprises the following functions. In response to the host processor losing the control of the enqueuing and the assigning, the ACD system assumes control of the enqueuing and the assigning. In response to the host processor regaining the ability to control the enqueuing and the assigning, control of the enqueing returns to the host processor, but the ACD system continues to control the assigning from each of the call queues until the call queue is emptied of at least calls that were enqueued therein under the control of the ACD system. Preferably, the ACD system continues to control the assigning from each of the call queues until that call queue is emptied of all calls that were enqueued therein when the host processor regained the control ability. Thereupon the control of the assigning from that call queue is returned to the host processor. The invention may be applied to other, non-call, contacts and to other, non-agent, resources for servicing contacts equally well.

Generally according to another aspect of the invention, a method for controlling enqueuing of calls in call queues of an ACD system, and for assigning the enqueued calls (and perhaps other work as well) to agents for servicing, by a host processor that is separate from the ACD system in a call center wherein the ACD system is capable of enqueuing calls in the call queues and assigning the enqueued calls to the agents in an absence of the control by the host processor, comprises the following functions. The host processor controls the enqueuing and the assigning of the calls in the call queues. When the host processor loses and subsequently regains the ability to control the enqueuing and the assigning, the host processor resumes control of the enqueuing of the calls upon regaining the control ability, but resumes the control of the assigning of the enqueued calls from each of the call queues only upon the call queue being emptied of at least calls that were enqueued therein while the host processor lost control of the enqueuing and assigning. Preferably, the host processor resumes the control of the assigning from each of the call queues only upon the call queue being emptied of all calls that were enqueued therein when the host processor resumed control of the enqueing. Also, each agent services calls from at least one of the queues, and the host processor resumes assigning calls (and perhaps other work as well) to each agent only when the host processor has resumed the control of the assigning from every call queue that is serviced by that agent. The invention may be applied to other, non-call, contacts and to other, non-agent, resources for servicing contacts equally well.

Advantageously according to the invention, when loss of CTI service (host processor control) is detected, the ACD system assumes responsibility for controlling calls that are in queue and also for any newly-arriving calls. The calls do not need to be moved, and the agents do not need to log into other skills. Instead, the ACD simply assumes control of the existing call queues. When CTI service is restored, the system goes into "recovery" mode. The CTI system does not immediately assume control of call assignment from the call queues, because there are still many calls in the contact center that are unknown to the host processor. Instead, it allows the ACD system to continue to assign calls to agents until there are no calls in the queue that were enqueued by the ACD system while CTI service was lost. Any new calls are enqueued in the same queues and will eventually be delivered by the host processor when it resumes control of those call queues. When all calls enqueued by the ACD system have been serviced from the call queue, the ACD system stops assigning calls to agents from this call queue and notifies the CTI system that it may now resume control of call assignment from this call queue. Only when control of all of the call queues that are serviced by an agent have been returned to host processor control will the host processor resume assignment of calls (and perhaps other work as well) to that agent. The same benefits may likewise be obtained for other, non-call, contacts and other, non-agent, resources for servicing contacts.

While the invention has been characterized in terms of a method, it also encompasses apparatus that performs the method. The apparatus preferably includes an effecter—any entity that effects the corresponding step, unlike a means—for each step. The invention further encompasses any computer-readable medium containing instructions which, when executed in a computer, cause the computer to perform the method steps.

These and other features and advantages of the present invention will become more apparent from the following description of an illustrative embodiment of the invention considered together with the drawing.

DETAILED DESCRIPTION

Figure 1:
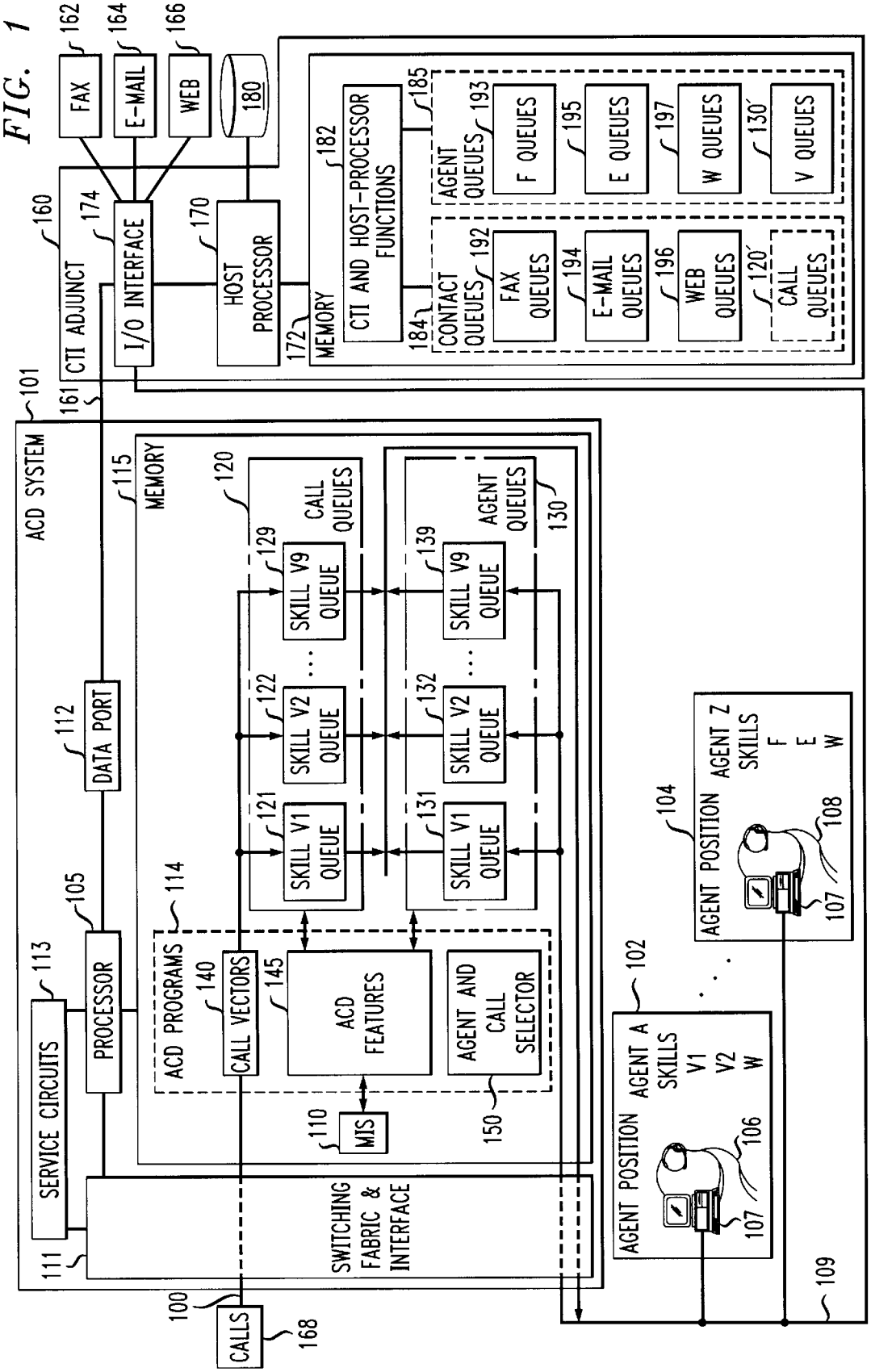
FIG. 1 is a block diagram of a multi-media contact center that includes an illustrative embodiment of the invention.

FIG. 1 shows an illustrative multi-media contact center. The contact center comprises a plurality of telephone lines and/or trunks 100 over which it receives or generates telephone calls 168. Lines and/or trunks 100 are selectively interconnected with a plurality of agent positions 102–104 via an ACD system 101. Each agent position 102–104 includes a voice-and-data terminal 107 for use by a corresponding agent 106–108 in handling calls and other contacts. Terminals 107 are connected to ACD system 101 by a voice-and-data transmission medium 109. Included in ACD system 101 is a conventional management information system (MIS) 110 that monitors ACD calls and ACD agents and gathers call and agent records and statistics for use in managing ACD system 101 and in generating reports.

ACD system 101 is illustratively the Avaya Inc. Definity® private-branch exchange (PBX)-based ACD system. It is a stored-program-controlled system that conventionally includes a communications switching fabric and interfaces (ports) 111 to external communications links 100 and 109, service circuits 113 (e.g., tone generators, announcement circuits, interactive voice response systems, etc.), a computer-readable medium such as memory 115 for storing ACD control programs 114 and data, and a processor 105 (i.e., a computer) for executing the stored ACD control programs and using the data to control the fabric and interfaces 111 and service circuits 113 to provide automatic call-distribution functionality and features. Included among the data stored in memory 115 are a set of ACD call queues 120 and a set of ACD agent queues 130. Each call queue 121–129 corresponds to a different agent skill (V1–V9) for servicing voice (V) calls, as does each agent queue 131–139. Included among ACD control programs 114 in memory 115 are call vectors 140. In conventional ACD system 101 operation, ACD calls 168 incoming on lines or trunks 100 are assigned by call vectors 140 to different call queues 121–129 based upon the agent skill that they require for their proper handling. ACD agents 106–108 who are available for handling calls are assigned to agent queues 131–139 based upon the skills which they possess. An agent may have multiple skills, and hence may be assigned to multiple agent queues 131–139 simultaneously. Also included among ACD control programs 114 in memory 115 is an agent and call selector 150. In conventional ACD system 101 operation, selector 150 effects an assignment between available calls 168 and agents 106–108 available to service the calls in a way that tends to optimize the operation of ACD system 101. For example, selector 150 tends to optimize in-queue wait times for calls. Further included among ACD control programs 114 in memory 115 are ACD features 145 which use service circuits 113 to provide a rich array of features to ACD calls and agents, such as data collection, announcement messages and tones, etc.

As described so far, the contact center of FIG. 1 constitutes a call center for handling ACD telephone calls 168. However, the multimedia contact center further includes a CTI adjunct 160 that integrates other types of contacts, such as fax 162, e-mail 164, and Web messaging 166, into the contact center to turn it into a multi-media contact center. CTI adjunct 160 connects to sources of the other contacts 162–166 via conventional input and output (I/O) interfaces 174. CTI adjunct 160 is a stored-program controlled machine: it includes a computer-readable medium such as memory 172 that stores control programs and data and one or more host processors 170 that execute programs out of memory 172 and use data from memory 172 and from an external database 180. Host processor 170 is connected by I/O interfaces 174 to a CTI link 161 and thereby to ACD system 101. CTI link 161 connects through a data port 112 of ACD system 101 to processor 105 of ACD system 101. Host processor 170 receives call-related data and exerts CTI control over ACD system 101 through CTI link 161. Host processor 170 is also connected by I/O interfaces 174 to transmission medium 109, by means of which it connects the other contacts 162–166 to agent positions 102–104 for servicing by agents 106–108, supplies data from database 180 to agent positions 102–104 for display on terminals 107, and receives data from terminals 105 of agent positions 102–104 for storage in database 180. CTI adjunct is illustratively the CRM Central product of Avaya Inc.

While only one processor 170 is shown in FIG. 1 for simplicity, typically two or more cooperating processors would be employed, one to perform CTI functions and the others to perform work-allocation functions.

Included among the control programs in memory 172 of CTI adjunct 160 are CTI and work-allocation functions 182. Functions 182 effect functionality that parallels and replaces the call-routing functionality of call vector 140 and agent and call selector 150 of ACD system 101 for calls 168 and for the other contacts 162–166 as well. Functions 182 implement contact queues 184 and agent queues 185 in memory 172. Contact queues 184 parallel call queues 120 for contacts 162–168. Contact queues 184 include fax queues 192 for fax contacts 162, e-mail queues 194 for e-mail contacts 164, Web message queues 196 for Web contacts 166, and call queues 120' for telephone calls 168. Call queues 120' duplicate call queues 120 of ACD system 101. As is the case with calls 168, which may be categorized and enqueued by call vectors 140 of ACD system 101 in different call queues 121–129 according to the skills that are needed for their servicing, contacts 162–168 may be similarly categorized and enqueued by function 182 of CTI adjunct 160. Hence, each of queues 192–196 and 120 may include a plurality of queues each corresponding to a different skill. Thus, just as there are a plurality of queues 121'–129' in call queues 120' each corresponding to a different voice skill (V), there may be a plurality of fax queues 192 each corresponding to a different fax skill (F), a plurality of e-mail queues 194 each corresponding to a different e-mail skill (E), and a plurality of Web queues 196 each corresponding to a different Web skill (W). Agent queues 185 parallel agent queues 130 for contacts 162–168. Agent queues 185 include queues 193 for agents with fax skills (F), queues 195 for agents with e-mail skills (E), queues 197 for agents with Web skills (W), and queues 130' for agents with voice skills (V). Agent queues 130' duplicate agent queues 130 of ACD system 101. Normally, there is one agent queue 185 for each contact queue 184. An agent 106–108 may possess a plurality of skills and therefore may be enqueued when idle in a plurality of agent queues 185.

Functions 182 illustratively comprise the Enterprise Advocate product of Avaya Inc.

The operation of the multi-media contact center of FIG. 1 is shown in FIGS. 2–5. During normal operation of the contact center, agent and call selector 150 of ACD system 101 is turned off (disabled) and call vectors 140 are disabled from making routing decisions. When a new call 168 arrives at ACD system 101, at step 200 of FIG. 2, an incoming call vector 140 detects its arrival and conventionally "parks" the call, at step 202. Incoming call vector 140 also notifies CTI adjunct 160 via CTI link 161 of the call and requests routing instructions from CTI adjunct 160, at step 204. Host processor 170 is notified of the arrival of any new contacts 162–168, at step 206, be they calls, faxes, e-mails, or Web messages. Host processor 170 analyzes the arrived contact to determine its type and what servicing the contact demands, at step 208. The analysis illustratively duplicates that which is normally performed for ACD calls by call vectors 140 to determine what skill the call requires for its servicing. If the contact is not a new call 168, as determined at step 210, on the basis of its analysis, host processor 170 checks the appropriate one of agent queues 185 to determine if a suitable agent 106–108 is available, at step 212. If a suitable agent is available, host processor 170 proceeds to steps 300 et seq. of FIG. 3 to select an agent to service the contact. If a suitable agent is not available, host processor 170 enqueues the contact in a corresponding one of its contact queues 184, at step 214. CTI adjunct 160 is done with the contact until a suitable agent becomes available, as indicated at step 216.

Returning to step 210, if the contact is a call, host processor 170 enqueues it in the call queue 121'–129' that corresponds to the call's needed skill, at step 220. Conventionally, the call would not be enqueued in call queues 120 of ACD 101. According to the invention, however, if the contact is a call, host processor 170 directs processor 105 of ACD system 101 to route the call to a selected queuing vector 140, at step 222. In response, processor 105 flags the call as being under control of an external host, at step 224, and routes the call to the selected queuing vector 140, at step 226. Queuing vector 140 enqueues the call as an ACD call in the one call queue 121–129 that corresponds to the call queue 121'–129' in which the call has been enqueued in CTI adjunct 160, at step 220, and ACD system 101 does so, at step 228. This advantageously makes the call accessible to ACD features 145, which proceed to provide the same call treatment, particularly ACD call-delay features, at step 230, that ACD system 101 provides to enqueued ACD calls when it is operating in stand-alone mode without CTI adjunct 160. This also exposes the call to MIS 110 and enables MIS to collect data concerning managing of the call by ACD system 101. MIS 110 provides measurements for agents' voice activities and also assists in forecasting and scheduling. Because the call is flagged in call queues 120 as an ACD call that is being controlled by an external host, ACD system 101 refrains from dequeuing and assigning the call to an available agent unless caused to do so by host processor 170. (In contrast, ACD system 101 may dequeue calls that are not designated as being controlled by host processor 170 and send them for servicing to selected ACD agents, independently of and without being caused to do so by host processor 170). Processor 105 of ACD system also notifies CTI adjunct 160 that the call has been enqueued, in call queues 120, at step 232.

Alternatively, CTI adjunct 160 dispenses with call queues 120' and host processor 170 does not enqueue calls on CTI adjunct 160 and keeps track of the calls via CTI link 161.

Host processor 170 decides what work should be serviced by what resource at what time. Upon receipt of the notification that the call has been enqueued on ACD system 101, at step 234, on the basis of its analysis of the call that was performed at step 208, host processor 170 checks the appropriate one of agent queues 130' to determine if a suitable agent 106–108 is available to service the call, at step 236. If a suitable agent is not available, CTI adjunct 160 is done with the call until a suitable agent becomes available, as indicated at step 238. But if it is determined at step 236 that a suitable agent is available to service the call, host processor 170 proceeds to steps 300 et seq. of FIG. 3 to select an agent to service the call.

Figure 2:
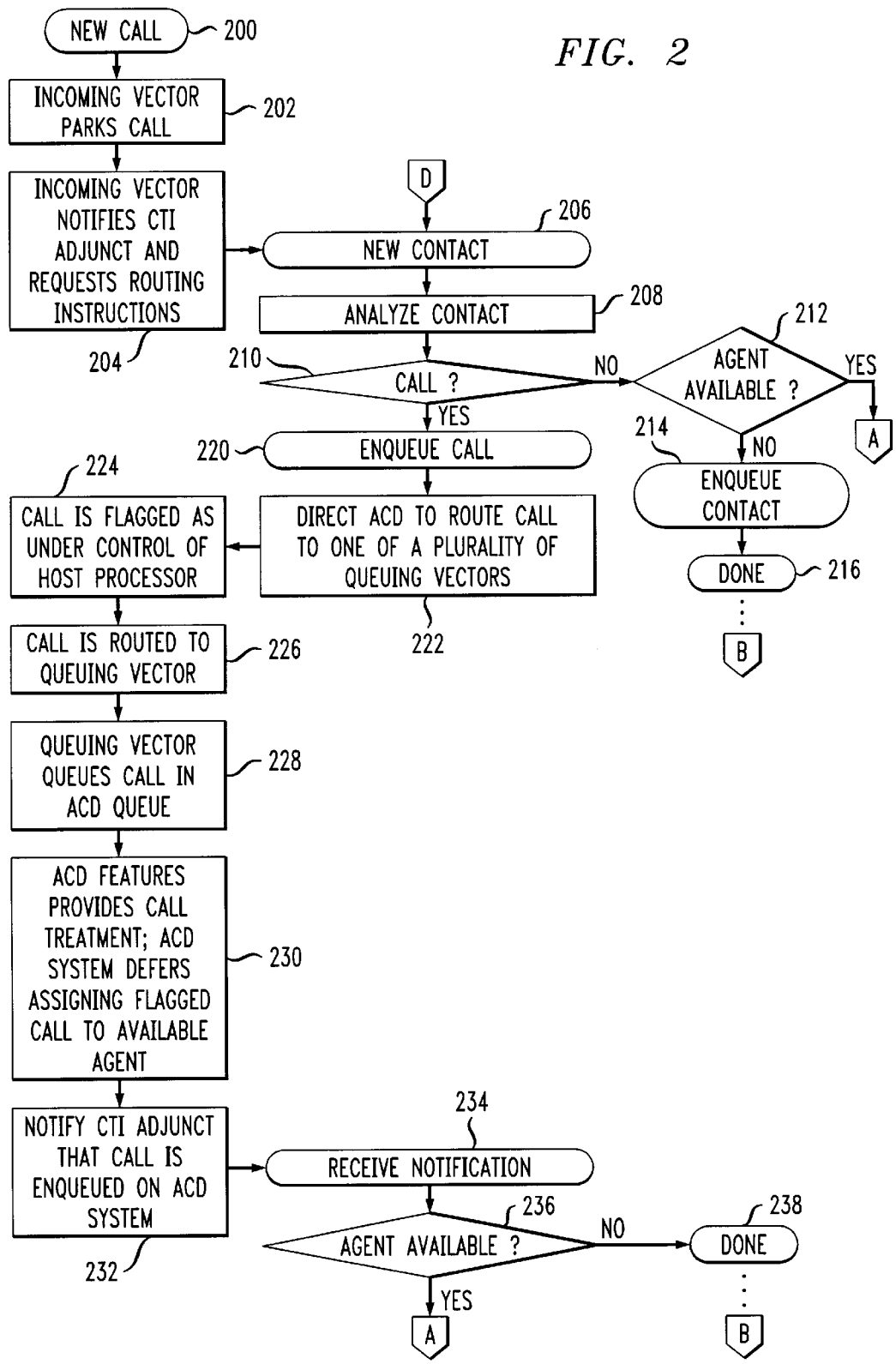
FIGS. 2–3 are a flow diagram of operation of the multi-media contact center of FIG. 1 in response to a contact becoming available for servicing.
Figure 3:
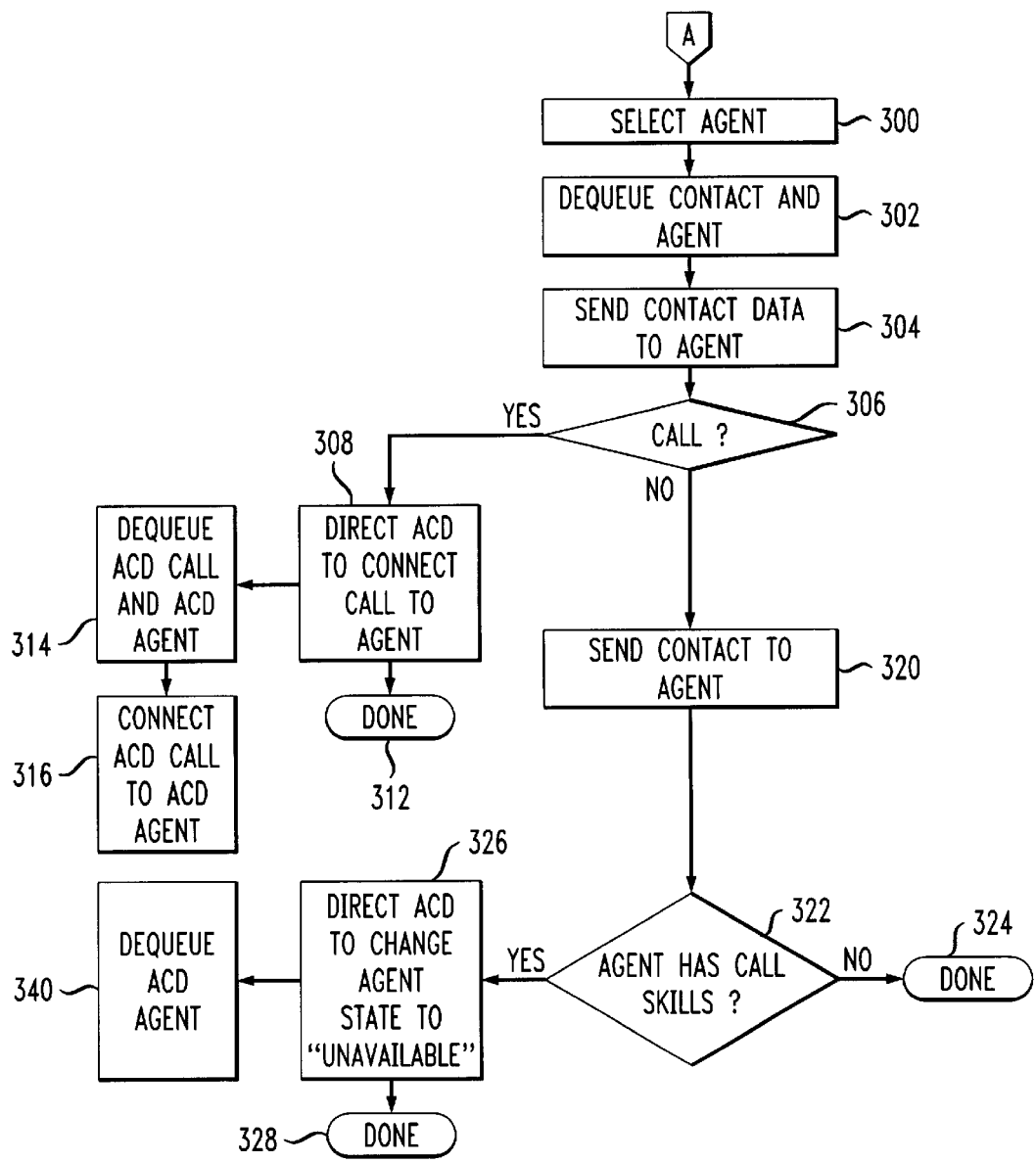
Figure 4:
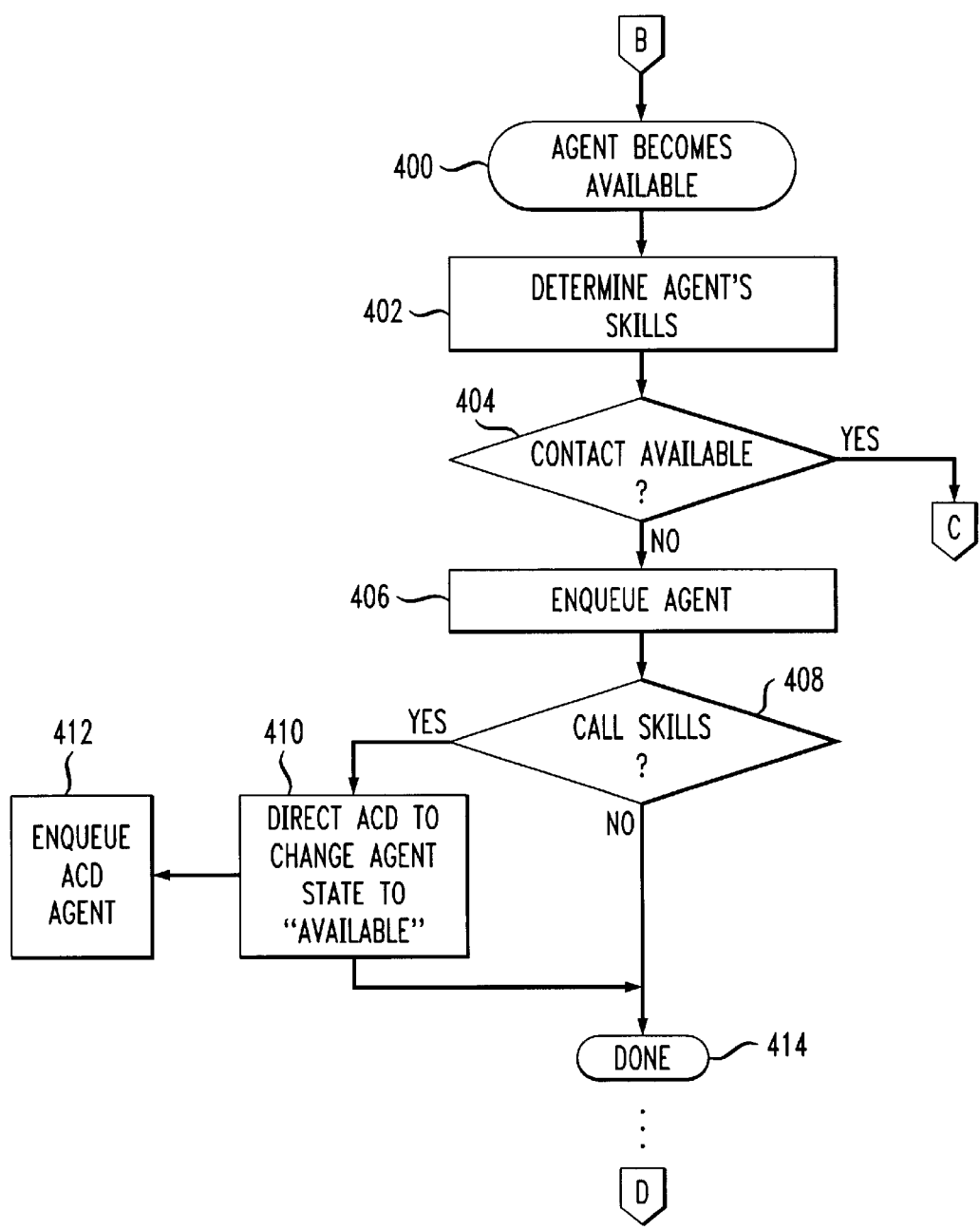
FIGS. 4–5 are a flow diagram of operation of the multi-media contact center of FIG. 1 in response to an agent becoming available to service a contact.

Step 300 of FIG. 3 is accessed from step 212 or step 236 of FIG. 2. At step 300, host processor 170 selects an available one of the suitable agents 102–104. Host processor 170 dequeues the selected agent from any agent queues 185 that the agent is enqueued on, and dequeues the contact that is to be serviced by the agent if it is enqueued, at step 302. Host processor 170 then retrieves data relating to the contact (e.g., to the caller) from database 180 and sends it to the selected agent, at step 304. If the contact is a call 168, as determined at step 306, host processor 170 directs ACD system 101 via CTI link 161 to connect the call to agent position 102–104 of the selected agent, at step 308. CTI adjunct 160 is then done with the contact for the time being, as indicated at step 312. In response to the directive, processor 105 of ACD system 101 would conventionally route a parked call to an agent extension. According to the invention, however, processor 105 dequeues the ACD call from ACD call queues 120 and dequeues the selected ACD agent from ACD agent queues 130, at step 314, and connects the ACD call to the selected ACD agent's position 102–104 to cause the selected ACD agent to answer the call. This results in ACD features behavior and MIS metrics for the call and agent that conform to those provided conventionally to ACD calls and ACD agents by ACD system 101.

Returning to step 306, if the contact that is assigned to the selected agent for servicing is not a call, host processor 170 sends the contact to the selected agent for servicing, at step 320. Conventionally, the agent would not be enqueued in agent queues 130. According to the invention, however, if an agent 106–108 has any call skills, he or she is enqueued as an ACD agent in agent queues 130 as well. Therefore, if the selected agent has any call skills (i.e., if the selected agent is enqueued in any voice (V) skill agent queues 130'), as determined at step 322, host processor 170 directs ACD system 101 via CTI link 161 to change the agent's state to "unavailable", at step 326. In response, processor 105 of ACD system 101 dequeues the agent from agent queues 130, at step 340. Following step 326, or step 322 if the agent does not have any call skills, host processor 170 is done with the contact for the time being, as indicated at steps 328 and 324, respectively.

Alternatively, CTI adjunct 160 dispenses with agent queues 130' and host processor 170 does not enqueue agents on CTI adjunct 160 for voice skills. Host processor 170 then keeps track of the agents for voice skills via CTI link 161.

An agent 106–108 becomes available to service contacts either by logging into CTI adjunct 160 or by becoming idle upon having completed servicing a contact. When an agent 106–108 becomes available, at step 400 of FIG. 4, host processor 170 determines (looks up) the agent's skills, at step 402, and then examines the corresponding contact queues 184 to determine if a contact 162–168 is available for being serviced by the agent, at step 404. If a suitable contact is not available, host processor 170 enqueues the agent in the ones of agent queues 185 that correspond to the agent's skills, at step 406. Normally, an agent would not be enqueued in agent queues 130 of ACD system 101 because CTI adjunct 160 and not ACD system 101 is in control of managing agents, and agent and call selector 150 is turned off. According to the invention, however, if the agent has any voice (V) skills (i.e., has been enqueued in any of agent queues 130'), as determined at step 408, host processor 170 directs ACD system 101 via CTI link 161 to change the agent's state to "available", at step 410, and in response processor 105 of ACD system 101 enqueues the agent as an ACD agent in corresponding agent queues 130, at step 412. This makes the availability of the agent known to ACD features 145 and MIS 110 and therefore allows them to take the agent's existence into account in their operations. Following step 408 or 410, CTI adjunct 160 is done with the agent for the time being, as indicated at step 414.

Figure 5:
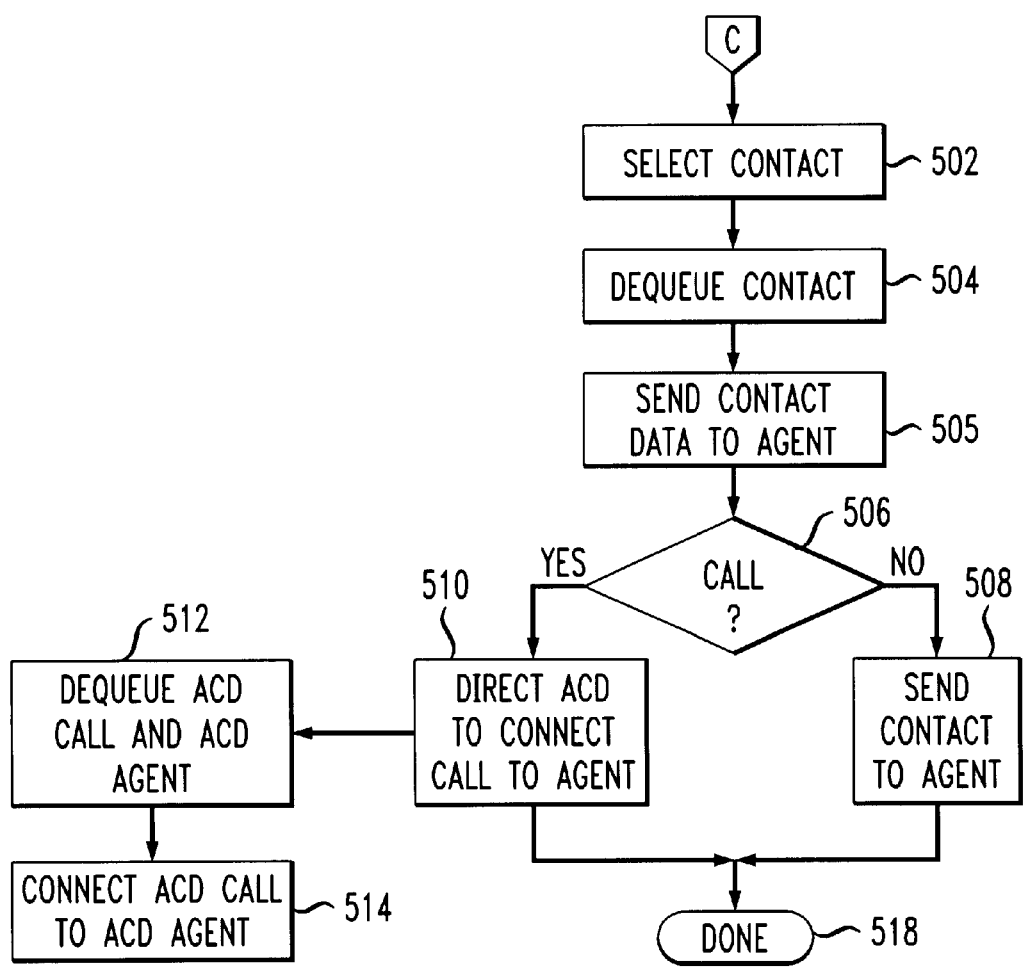

Returning to step 404, if it is there determined that a suitable contact is available for being serviced by the available agent, host processor 170 selects a contact from among the suitable contacts that are enqueued in contact queues 184, at step 502 of FIG. 5, and dequeues the selected contact, at step 504. Host processor 170 then retrieves data relating to the contact (e.g., to the caller) from database 180 and sends it to terminal 107 of the agent who is servicing the call via transmission medium 109, at step 505. If the selected contact is not a call, as determined at step 506, host processor 170 sends the contact to agent position 102–104 of the available agent 106–108 for servicing, at step 508. If the selected contact is a call, as determined at step 506, host processor 170 directs processor 105 of ACD system 101 to connect the selected call to the available agent 106–108, at step 510, via a "redirect call from queue" message. Conventionally, the call would not be enqueued in call queues 120, and so processor 105 would merely connect the parked call to the agent extension as directed, at step 514. According to the invention, however, the call is enqueued as an ACD call in call queues 120, and so processor 105 dequeues the call from call queues 120, at step 512, and then connects it as an ACD call to the agent to cause the agent to answer and service the call, at step 514. Processor 105 treats the "redirect call from queue" message not as a request to route to an extension but as an answer from ACD queue. Consequently all ACD and MIS functionality downstream will treat and measure this call like any standard ACD call. I.e., MIS messaging statistics, zip-tone, RONA, etc., follow. The agent having been provided with a contact to serve at step 508 or 510, CTI adjunct 160 is done with the contact for the time being, as indicated at step 518.

Another advantage provided by the above-described arrangement is that it enables calls to be handled in the system of FIG. 1 even when host processor 170 is no longer able to control the calls because of a system or link failure. When any failure is detected that would prevent host processor 170 from properly controlling voice calls on ACD system 101, ACD system 101 takes over control of all calls. CTI service failure may occur because of problems with either CTI adjunct 160 or CTI link 161. If the CTI and work-allocation functions are supported on different processors, this can also occur because of problems with work-allocation processors or the links between those processors and CTI adjunct 160. ACD system 101 may detect such service failures on its own, or may be informed of a service failure by means of a CTI message. When failure of CTI service is detected, host processor 170 stops delivering work of any kind to ACD agents, and ACD system 101 reverts to its conventional, stand-alone ACD, operation with call vector 140 and agent and call selector 150 active and responsible for enqueuing calls and ACD agents and assigning and delivering calls to ACD agents for servicing. When CTI service is restored, CTI adjunct 160 does not immediately assume control of call delivery or of assignment of other work to agents, because there may be many calls enqueued in ACD system 101 that are unknown to CTI adjunct 160 because they have arrived while CTI adjunct 160 was out-of-service. Therefore, when CTI service is restored, the system initially goes into a "recovery" mode of operation. In this mode, CTI adjunct 160 resumes control of any newly-arriving calls, but allows ACD system 101 to continue to deliver enqueued calls to agents until there are no calls that the CTI adjunct 160 does not know about in a call queue 120. At that point, ACD system 101 stops delivering calls to agents from that call queue and notifies CTI adjunct 160 that it may resume control of call delivery and other work for that skill (the skill that corresponds to the subject call queue). When all call queues 120 have been purged of calls unknown to CTI adjunct 160, normal operation of the system of FIG. 1 resumes.

Throughout the failover and recovery periods, host processor 170 may continue assigning non-call work to agents who are not controlled by ACD system 101.

Figure 6:
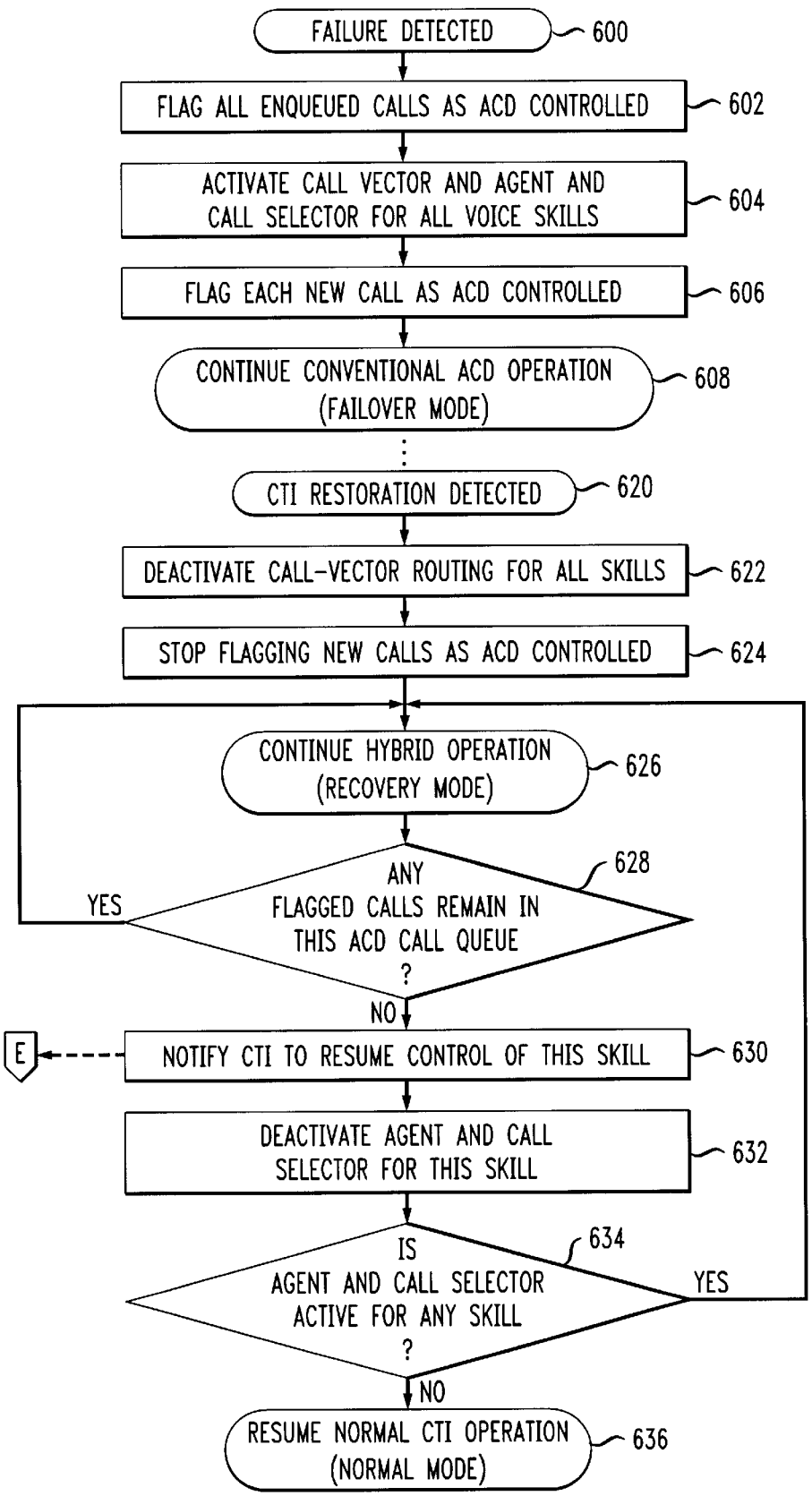
FIG. 6 is a flow diagram of operations of the ACD system of the contact center of FIG. 1 during CTI failure and recovery.
Figure 7:
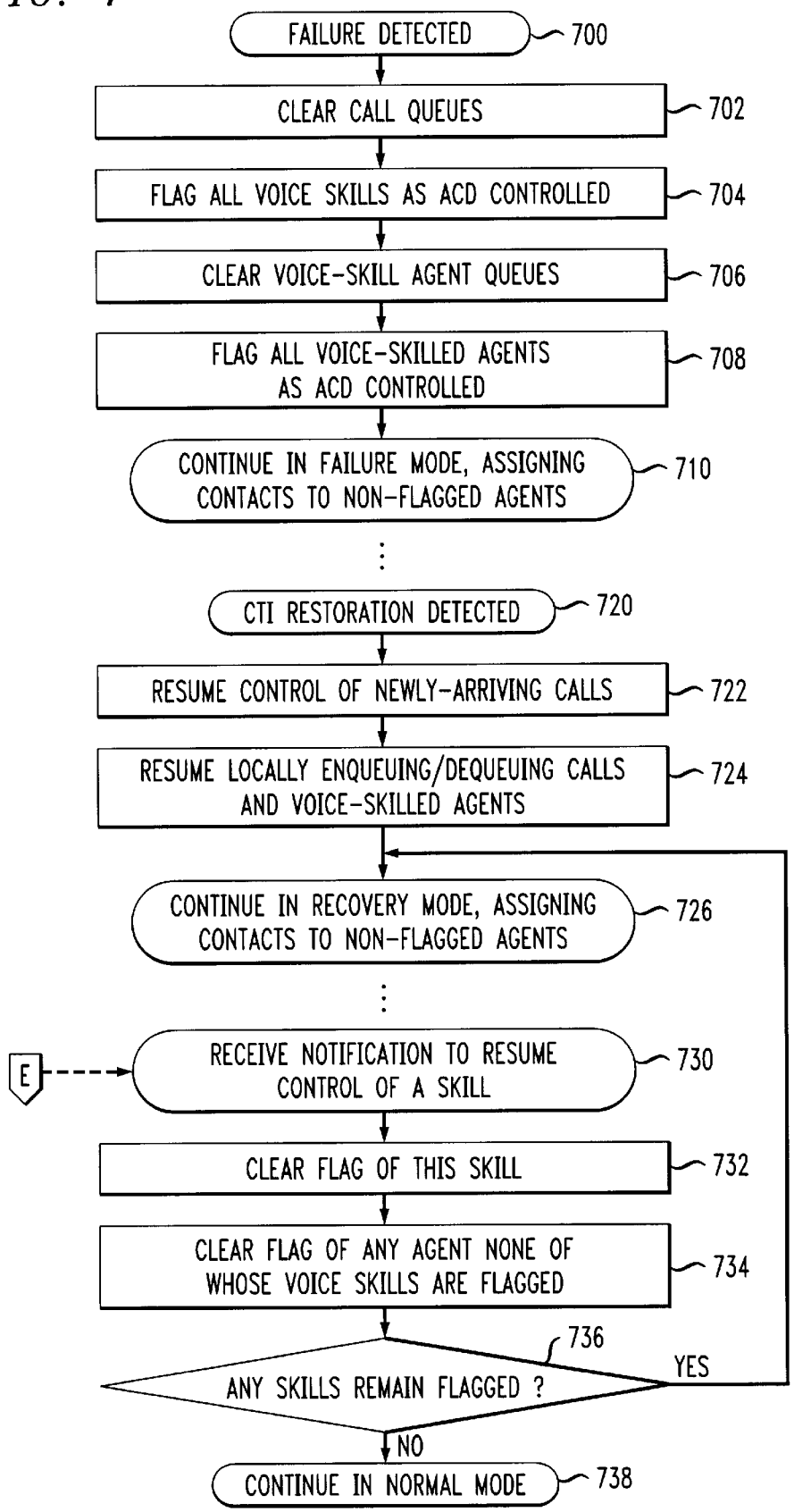
FIG. 7 is a flow diagram of operations of the CTI adjunct of the contact center of FIG. 1 during ACD failure and recovery.

The failure and recovery operation of ACD system 101 is shown in FIG. 6, and the failure and recovery operation of CTI adjunct 160 is shown in FIG. 7. The occurrence of a failure usually manifests itself as the loss of communications between ACD system 101 and CTI adjunct 160. This can be due to failure of CTI adjunct 160 and/or failure of CTI link 161. If the work-allocation functions are performed on a separate processor, this can also be due to failure of the work-allocation system and/or the link between it and CTI adjunct 160. When processor 105 of ACD system 101 detects or is informed of any failure that prevents host processor 170 from controlling calls, at step 600 of FIG. 6, it flags each call that is presently enqueued in call queues 120 as "ACD controlled", at step 602. Processor 105 then activates call vector 140 and agent and call selector 150 for all ACD skills, at step 604, thereby restoring conventional, stand-alone ACD, operation of ACD system 101, at step 608. However, processor 105 flags each new call arriving at ACD system 101 with the "ACD controlled" flag, at step 606.

The failure detected by ACD system 101 at step 600 may have just been a failure of CTI link 161 and not of CTI adjunct 160. In that case, host processor 170 of CTI adjunct 160 is active and detects a failure that prevents it from being able to control calls at ACD system 101, at step 700 of FIG. 7. In response, host processor 170 clears its call queues 120', at step 702, flags each voice (V) skill as "ACD controlled", at step 704, clears its voice-skilled agent queues 130', at step 706, and flags each agent who has a voice skill as "ACD controlled", at step 708. CTI adjunct 160 then continues to operate in "failover" mode, wherein it assigns contacts (i.e., contacts from non-flagged-skill contact queues) to only non-flagged agents, at step 710.

Returning to FIG. 6, when processor 105 of ACD system 101 detects restoration of CTI adjunct 160 (which may merely have involved restoration of CTI link 161), at step 620, it deactivates call-routing functionality of call vector 140, at step 622, giving control of newly-arriving calls back to CTI adjunct 160. Processor 105 also stops flagging new calls as "ACD controlled", at step 624, and then continues to operate in a hybrid mode wherein CTI adjunct 160 controls enqueuing of new calls in call queues 120 but ACD system 101 controls allocation and delivery of ACD-controlled calls from call queues 120 to agents, at step 626. Whenever processor 105 allocates a call from a call queue 121–128 to an agent, it checks whether any calls that are flagged as "ACD controlled" remain in that ACD call queue, at step 628. If so, processor 105 merely returns to step 626; if not, processor 105 notifies CTI adjunct 160 to resume CTI control of this skill, at step 630, and deactivates agent and call selector 150 for this skill, at step 632. Processor 105 then checks whether agent and call selector 150 is still active for any skills, at step 634. If so, processor 105 returns to step 626; if not, processor 105 resumes normal CTI operation of ACD system 101 where call vector 140 and agent and call selector 150 are turned off for all skills and all calls are controlled by CTI adjunct 160, at step 636.

Returning to FIG. 7, when host processor 170 detects restoration of CTI service (which may merely have involved restoration of CTI link 161), at step 720, it resumes control of calls newly-arriving at ACD system 101, at step 722. This includes resuming to enqueue newly-arriving calls in its call queues 120' and resuming to enqueue and dequeue in and from agent queues 130' any voice-skilled agents who become newly enqueued or dequeued by ACD system 101 in and from agent queues 130, at step 724. Host processor 170 then continues to operate in a "recovery" mode, wherein—as in the failover mode—it assigns contacts to non-flagged agents.

When host processor 170 receives notification (see step 630) from ACD system 101 to resume control of a particular skill, at step 730, host processor 170 clears the "ACD controlled" flag of that skill, at step 732. Host processor 170 then compares the voice skills of each voice-skilled agent against the skill flags and clears the "ACD controlled" flag of each agent none of whose voice skills are flagged as "ACD controlled", at step 734. This returns the unflagged agent to the pool of agents who are controlled and allocated by CTI adjunct 160. If any skills remain flagged as "ACD controlled", as determined at step 736, host processor 170 returns to step 728; of no skills remain flagged as "ACD controlled", host processor 170 resumes normal CTI operation where CTI adjunct 160 controls and allocates all calls and agents of the system of FIG. 1, at step 738.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method of operating a contact center comprising an automatic call distribution (ACD) system and a host processor, separate from the ACD system, that controls enqueuing of calls in call queues of the ACD system and controls assigning of the calls to agents for servicing, comprising:

in response to the host processor losing the control of the enqueuing and the assigning, controlling the enqueuing and the assigning by the ACD system;

in response to the host processor regaining ability to control the enqueuing and the assigning, returning control of the enqueing to the host processor;

further in said response, continuing the ACD system control of the assigning from each of said call queues until said call queue is emptied of at least calls that were enqueued therein under control of the ACD system; and in response to the emptying of each of said call queues, returning control of the assigning from the call queue to the host processor.

2. The method of claim 1 wherein:
continuing comprises
continuing the ACD system control of the assigning from each of said call queues until said call queue is emptied of all calls that were enqueued therein when the host processor regained the control ability.

3. The method of claim 1 wherein:
returning control of the enqueuing to the host processor comprises
the host processor resuming the control of the enqueuing; and
returning control of the assigning to the host processor comprises
the host processor resuming the control of the assigning.

4. The method of claim 1 wherein:
the step of controlling the enqueuing and the assigning by the ACD system is preceded by the steps of
controlling the enqueuing and the assigning by the host processor, and
losing the host processor control of the enqueuing and the assigning.

5. The method of claim 1 wherein:
each said agent services calls from at least one of the call queues; and
the host processor resumes assigning calls to each said agent only when the host processor has resumed the control of the assigning of the calls from every said call queue serviced by that agent.

6. A method of operating a contact center comprising an automatic call distribution (ACD) system having a plurality of call queues, and further comprising a host processor separate from the ACD system, the method comprising:
enqueuing calls in the call queues under control of the host processor;
assigning the enqueued calls to agents for servicing under control of the host processor;
in response to loss of the host processor control of the enqueuing and the assigning, enqueuing calls in the call queues under control of the ACD system;
further in response to the loss, assigning the enqueued calls to the agents for servicing under control of the ACD system;
in response to regaining ability of the host processor to control the enqueuing and the assigning, resuming enqueuing of calls in the call queues under control of the host processor;
further in response to the regaining, continuing assigning of the enqueued calls from each of the call queues to the agents for servicing under control of the ACD system until the call queue is emptied of calls that were enqueued therein when the host processor regained the control ability; and
in response to the emptying of each of said call queues, resuming assigning of the enqueued calls from the call queue to the agents for servicing under control of the host processor.

7. The method of claim 6 wherein:
enqueuing calls comprises
enqueuing the calls in both the call queues of the ACD system and call queues of the host processor under control of the host processor;
assigning the enqueued calls comprises
assigning the calls enqueued in both the call queues of the ACD system and the call queues of the host processor under control of the host processor;
enqueuing calls in the call queues under control of the ACD system comprises
in response the loss, clearing the call queues of the host processor, and
further in response to the loss, enqueuing calls only in the call queues of the ACD system under control of the ACD system;
resuming enqueuing of calls under control of the host processor comprises
resuming enqueuing calls in both the call queues of the ACD system and call queues of the host processor under control of the host processor; and
resuming assigning of the enqueued calls under control of the host processor comprises
in response to the emptying of each of said call queues of the ACD system, resuming assigning calls enqueued in both the call queues of the ACD system and the call queues of the host processor under control of the host processor.

8. The method of claim 6 wherein:
each said agent services calls from at least one of the call queues; and
the host processor resumes assigning calls to each said agent only when the host processor has resumed the control of the assigning of the calls from every said call queue serviced by that agent.

9. An automatic call distribution (ACD) system for enqueuing calls in call queues of the ACD system under control of a host processor that is separate from the ACD system and for assigning the calls to agents for servicing under the control of the host processor in a contact center, comprising:
first means in the ACD system responsive to the host processor losing the control of the enqueuing, for controlling the enqueuing by the ACD system, and responsive to the host processor regaining ability to control the enqueuing, for returning control of the enqueuing to the host processor; and
second means in the ACD system responsive to the host processor losing the control of the assigning, for controlling the assigning by the ACD system, and responsive to the host processor regaining ability to control the assigning, for continuing controlling of the assigning by the ACD system from each of said call queues until said call queue is emptied of at least calls that were enqueued therein under control of the ACD system and only then returning control of the assigning from the call queue to the host processor.

10. The ACD system of claim 9 wherein:
the second means are for continuing controlling of the assigning by the ACD system from each of said call queues until said call queue is emptied of all calls that were enqueued therein when the host processor regained the ability to control the enqueuing.

11. An apparatus that performs the method of one of claims 1–5.

12. A computer-readable medium containing executable instructions which, when executed in a computer, cause the computer to perform the method of one of claims 1–5.

13. A host processor for controlling enqueuing of calls in call queues of an ACD system that is separate from the host processor and for assigning the enqueued calls to agents for servicing in a call center wherein the ACD system is capable of enqueuing calls in the call queues and assigning of the enqueued calls to the agents in an absence of the control by the host processor, the host processor comprising:

means for controlling the enqueuing of the calls in the call queues, responsive to loss and subsequent return of the control of the enqueuing, for resuming the enqueuing of the calls in the call queues; and means for controlling the assigning of the enqueued calls to the agents, responsive to loss and subsequent return of control of the assigning, for resuming the control of the assigning of the enqueued calls from each of said call queues only upon said call queue being emptied of at least calls that were enqueued therein while the means for controlling the assigning lost control of the assigning.

14. The host processor of claim 13 wherein:

the means for controlling the assigning are for resuming the control of the assigning of the enqueued calls from each of said call queues only upon said call queue being emptied of all calls that were enqueued therein when the host processor resumed control of the enqueuing of the calls in the call queues.

15. The host processor of claim 13 wherein:

each said agent is for servicing calls from at least one of the queues; and the means for controlling the assigning resume assigning calls to each said agent only when the host processor has resumed the control of the assigning of the calls from every said call queue serviced by that agent.

16. The host processor of claim 13 wherein:

the host processor comprises a plurality of call queues corresponding to the call queues of the ACD system;

the means for controlling the enqueuing comprise means for controlling the enqueuing of the calls in the call queues of the host processor as well as in the call queues of the ACD system, responsive to the loss of the control of the enqueuing, for ceasing to enqueue the calls in the call queues of the host processor and clearing the call queues of the host processor, and responsive to the return of the control of the enqueuing, for resuming the enqueuing of the calls in the call queues of the host processor; and the means for controlling the assigning comprise means for assigning of the calls from the call queues of the host processor as well as controlling the assigning from the call queues of the ACD system, responsive to the loss of the control of the assigning, for ceasing to assign the calls from the call queues of the host processor, and responsive to the return of the control of the assigning, for resuming the assigning of the enqueued calls from each of said call queues of the host processor only upon the corresponding call queue of the ACD system being emptied of at least calls that were enqueued therein while the means for controlling the assigning lost control of the assigning.

17. The host processor of claim 16 wherein:

the means for controlling the assigning are for resuming the control of the assigning of the enqueued calls from each of said call queues of the ACD system and for resuming the assigning of the enqueued calls from each said corresponding call queue of the host processor only upon said call queue of the ACD system being emptied of all calls that were enqueued therein when the host processor resumed control of the enqueuing of the calls in the call queues of the ACD system;

each said agent is for servicing calls from at least one of the queues of the ACD system and the corresponding at least one of the queues of the host processor; and the means for controlling the assigning resume assigning calls to each said agent only when the host processor has resumed the control of the assigning of the calls from every said call queue of the ACD system serviced by that agent.

18. A method for controlling enqueuing of calls in call queues of an ACD system, and for assigning the enqueued calls to agents for servicing, by a host processor that is separate from the ACD system in a call center wherein the ACD system is capable of enqueuing calls in the call queues and assigning of the enqueued calls to the agents in an absence of the control by the host processor, comprising:

the host processor controlling the enqueuing and the assigning of the calls in the call queues;

the host processor losing and subsequently regaining ability to control the enqueuing and the assigning;

in response to the losing and subsequent regaining, the host processor resuming control of the enqueuing of the calls in the call queues; and further in response to the losing and subsequent regaining, the host processor resuming the control of the assigning of the enqueued calls from each of said call queues only upon said call queue being emptied of at least calls that were enqueued therein while the host processor lost control of the enqueuing and assigning.

19. The method of claim 18 wherein:

resuming the control of the assigning comprises the host processor resuming the control of the assigning of the enqueued calls from each of said call queues only upon said call queue being emptied of all calls that were enqueued therein when the host processor resumed control of the enqueuing of the calls in the call queues.

20. The method of claim 18 wherein:

each said agent is for servicing calls from at least one of the call queues; and resuming the control of the assigning comprises the host processor resuming assigning calls to each said agents only when host processor has resumed the control of the assigning of the calls from every said call queue serviced by that agent.

21. The method of claim 18 wherein:

the host processor comprises a plurality of call queues corresponding to the call queues of the ACD system;

controlling the enqueuing comprises the host processor enqueuing the calls in the call queues of the host processor as well as controlling the enqueing in the call queues of the ACD system;

losing and subsequently regaining ability to control the enqueuing and the assigning comprises in response to losing the control of the enqueuing, ceasing to enqueue the calls in the call queues of the host processor, and in response to losing the control of the enqueuing, clearing the call queues of the host processor;

resuming control of the enqueuing comprises in response to regaining the control of the enqueuing, the host processor resuming the enqueuing of the calls in the call queues of the host processor;

controlling the assigning comprises assigning the calls from the call queues of the host processor as well as controlling the assigning from the call queues of the ACD system;

losing and subsequently regaining ability to control the enqueuing and the assigning comprises
in response to losing the control of the assigning, ceasing to assign the calls from the call queues of the host processor; and
resuming control of the assigning comprises
in response to regaining the control of the assigning, the host processor resuming the assigning of the enqueued calls from each of said call queues of the host processor only upon the corresponding call queue of the ACD system being emptied of at least calls that were enqueued therein while the host processor lost control of the assigning.

22. The method of claim 21 wherein:
resuming the control of the assigning comprises
resuming the control of the assigning of the enqueued calls from each of said call queues of the ACD system and resuming the assigning of the enqueued calls from each said corresponding call queue of the host processor only upon said call queue of the ACD system being emptied of all calls that were enqueued therein when the host processor resumed control of the enqueuing of the calls in the call queues of the ACD system;
each said agent is for servicing calls from at least one of the queues of the ACD system and the corresponding at least one of the queues of the host processor; and
controlling the assigning comprises
resuming assigning calls to each said agent only when the host processor has resumed the control of the assigning of the calls from every said call queue of the ACD system serviced by that agent.

* * * * *